United States Patent
Bacon, Jr. et al.

[19]

[11] Patent Number: 5,874,016

[45] Date of Patent: Feb. 23, 1999

[54] CONCRETE COLUMN FORMING TUBE HAVING A SMOOTH INSIDE COATED SURFACE

[75] Inventors: Robert D. Bacon, Jr.; Arnold B. Floyd, Jr.; Troy W. Johnson, Jr.; James R. Martin, all of Hartsville; Honor S. Bonds, Florence; John F. Whitehead, Hartsville, all of S.C.; Wim van de Camp, Meerssen, Netherlands

[73] Assignee: Sonoco Products Company, Hartsville, S.C.

[21] Appl. No.: 131,228

[22] Filed: Oct. 4, 1993

[51] Int. Cl.$^6$ ............................... B28B 7/34; B28B 7/36; B29C 35/56; E04C 3/30

[52] U.S. Cl. ........................... 249/48; 249/51; 249/114.1; 249/115; 249/134; 264/311; 264/317; 264/333; 264/338

[58] Field of Search ........................ 249/48, 112, 114.1, 249/DIG. 2, 135, 51, 115, 134; 264/338, 311, 333, 317; 118/55

[56] References Cited

U.S. PATENT DOCUMENTS

| | | |
|---|---|---|
| 1,865,692 | 7/1932 | Hume . |
| 2,677,165 | 5/1954 | Copenhaver et al. . |
| 2,836,874 | 6/1958 | Clarkson ................................... 249/48 |
| 2,914,833 | 12/1959 | Hart, Jr. et al. . |
| 2,922,343 | 1/1960 | Dunlap, Jr. et al. . |
| 3,029,027 | 4/1962 | Gray ......................................... 118/55 |
| 3,219,472 | 11/1965 | Hucks, Jr. . |
| 3,406,724 | 10/1968 | Carlstrom et al. . |
| 3,413,955 | 12/1968 | Patti ........................................... 118/55 |
| 3,640,758 | 2/1972 | Hogstrom et al. ......................... 118/55 |
| 3,682,434 | 8/1972 | Boenig . |
| 4,389,036 | 6/1983 | Abou-Ezzeddine ...................... 249/120 |
| 4,595,168 | 6/1986 | Goodwin .................................... 249/48 |
| 4,597,995 | 7/1986 | Snow et al. . |
| 4,957,270 | 9/1990 | Rummage et al. . |
| 4,976,291 | 12/1990 | Yoshikawa et al. ...................... 264/311 |
| 5,328,142 | 7/1994 | Weekers ................................. 249/114.1 |

FOREIGN PATENT DOCUMENTS

| | | |
|---|---|---|
| 1387305 | 12/1964 | France . |
| 1452533 | 8/1966 | France . |
| 5-133100 | 5/1993 | Japan ........................................ 249/48 |
| 828415 | 2/1960 | United Kingdom ..................... 249/48 |

OTHER PUBLICATIONS

European Search Report, Appl. No. EP 94 30 7260, 11 Jan. 1995, W. Vijverman.

*Primary Examiner*—Karen Aftergut
*Attorney, Agent, or Firm*—Bell Seltzer Intellectual Property Law Group of Alston & Bird LLP

[57] ABSTRACT

A concrete column forming tube and method of making same for receiving poured concrete column therein to produce a concrete column is characterized by a smooth inside coated surface in the forming tube to eliminate spiral seam lines and other undesirable characteristics on the outside surface of the formed concrete column. The tube is formed from spirally-wound plies of paper adhered together and has a centrifugally-cast epoxy resin coating sprayed onto the inside surface of the spirally-wound tube while the tube is rotating to produce a smooth inside coated surface on the forming tube.

15 Claims, 4 Drawing Sheets

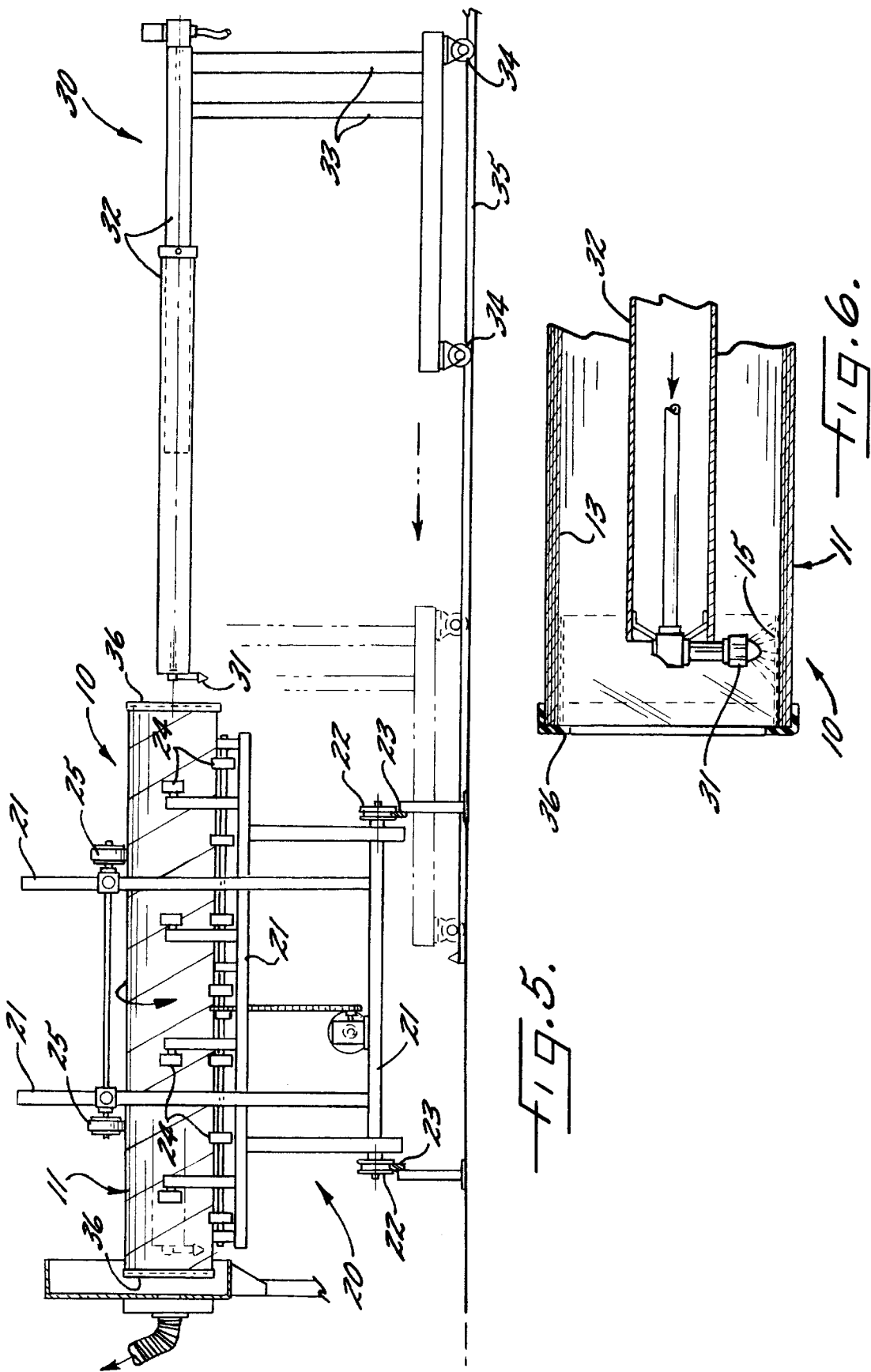

CONCRETE COLUMN FORMING TUBE HAVING A SMOOTH INSIDE COATED SURFACE

FIELD OF THE INVENTION

This invention relates to a concrete column forming tube and method of making same for receiving poured concrete therein to produce a concrete column and which utilizes an elongated cylindrical tube made of spirally-wound plies of paper adhered together and which is characterized by a smooth inside coated surface in the forming tube to eliminate spiral seam lines and other undesirable characteristics on an outside surface of the formed concrete column.

BACKGROUND OF THE INVENTION

For many years, concrete column forming tubes have been utilized and have been constructed of spirally-wound plies of paper adhered together and defining an inside wall surface of predetermined diameter which is coated with plastic material for concrete release properties. This plastic coating was usually provided by coating one side of the paper plies prior to spiral winding of the tube. These forming tubes received poured concrete therein which dried and set-up to produce a concrete column. The forming tube was then striped away from the concrete column and this operation was aided by the release properties of the plastic coating on the inside of the tube to leave a finished concrete column. These types of prior art tubes are illustrated in U.S. Pat. Nos. 2,677,165 and 2,914,833, for example, which are assigned to the assignee of the present invention.

Due to the spirally-wound construction of these forming tubes, spiral seam lines and other undesirable surface characteristics were usually present on the inside wall surface of the forming tube which resulted in spiral seam lines and other irregularities molded on the outside surface of the produced concrete column. From an aesthetic standpoint, these spiral seam lines and other irregularities were often undesirable on the produced concrete column and sandblasting or other finishing techniques were necessary to produce a smooth outside surface on the concrete columns.

In an effort to overcome these problems, separately-formed flexible cylindrical liners have been proposed by U.S. Pat. No. 4,595,168 and Assignee's U.S. Pat. No. 4,957,270. These separate liners were inserted into the concrete column forming tube after manufacture of the tube and often at the concrete column forming site. While these separate liners improved the surface quality of the resulting concrete column, they did often produce one vertical seam line running the length of the formed column, were expensive to manufacture, difficult to maintain and install and presented other problems in the manufacture and use thereof.

OBJECT AND SUMMARY OF THE INVENTION

Accordingly, it is the object of this invention to provide a concrete column forming tube and method of making same for receiving poured concrete therein to produce a concrete column and which is constructed of spirally-wound plies of paper and which eliminates the problems discussed above with prior coatings and liners and provides a smooth inside coated surface in the forming tube which eliminates undesired spiral seam lines and other characteristics from being produced on the outside surface of the formed concrete column.

By this invention, it has been found that the above object may be accomplished by providing a concrete column forming tube which is constructed of spirally-wound plies of paper adhered together and defining an inside wall surface having spiral seam lines thereon, and a centrifugally-cast epoxy resin coating sprayed onto the inside wall surface of the spirally-wound paper tube while the tube is rotating to produce a smooth inside coated surface on the forming tube to eliminate spiral seam lines and other undesirable characteristics on an outside surface of the formed concrete column.

The preferred spirally-wound forming tube includes three inside plies having deckled overlapped edges and each having a Basis weight range of about 90–100 lbs./1000 square feet and a density range of about 3.6–4.0 basis weight/point and at least five outside plies having butted edges and having a basis weight range of about 70–120 lbs./1000 square feet and a density range of about 2.7–3.5 basis weight/point (commonly referred to in the paper industry as lbs./point). The density is the basis weight in lbs./1000 square feet divided by the thickness of the paper in points, where one point is equivalent to one-thousandth of an inch as is well known in the art. The centrifugally-cast epoxy resin coating preferable comprises about 75–95% by weight low viscosity multifunctional resin and about 25–5% by weight accelerated aliphatic amine catalyst. The centrifugally-cast epoxy resin coating preferable has a thickness of about 0.010–0.125 inch.

The method of making the above described concrete column forming tube includes the step of providing an elongate cylindrical tube of spirally-wound plies of paper adhered together, centrifugally-casting an epoxy resin coating on the inside wall surface of the tube by depositing, preferable by spraying, the epoxy resin on the inside of the tube while the tube is rotating in the horizontal position. The centrifugally-cast epoxy resin coating is then cured, preferable by heating the epoxy resin coating to a predetermined temperature for a predetermined period of time.

BRIEF DESCRIPTION OF THE DRAWINGS

While some of the objects and advantages of the present invention have been set forth above, other advantages will become apparent from the description of the preferred embodiment of the invention when taken in conjunction with the accompanying drawings in which:

FIG. 5 is a side elevational view of apparatus illustrated diagrammatically in FIG. 3 and taken generally along the line 5—5 of FIG. 3;

FIG. 6 is an enlarged partial sectional view illustrating spraying of coating on an inside surface of a tube while being rotated by a rotator device.

DETAILED DESCRIPTION OF PREFERRED EMBODIMENT OF THE INVENTION

Figure 1:
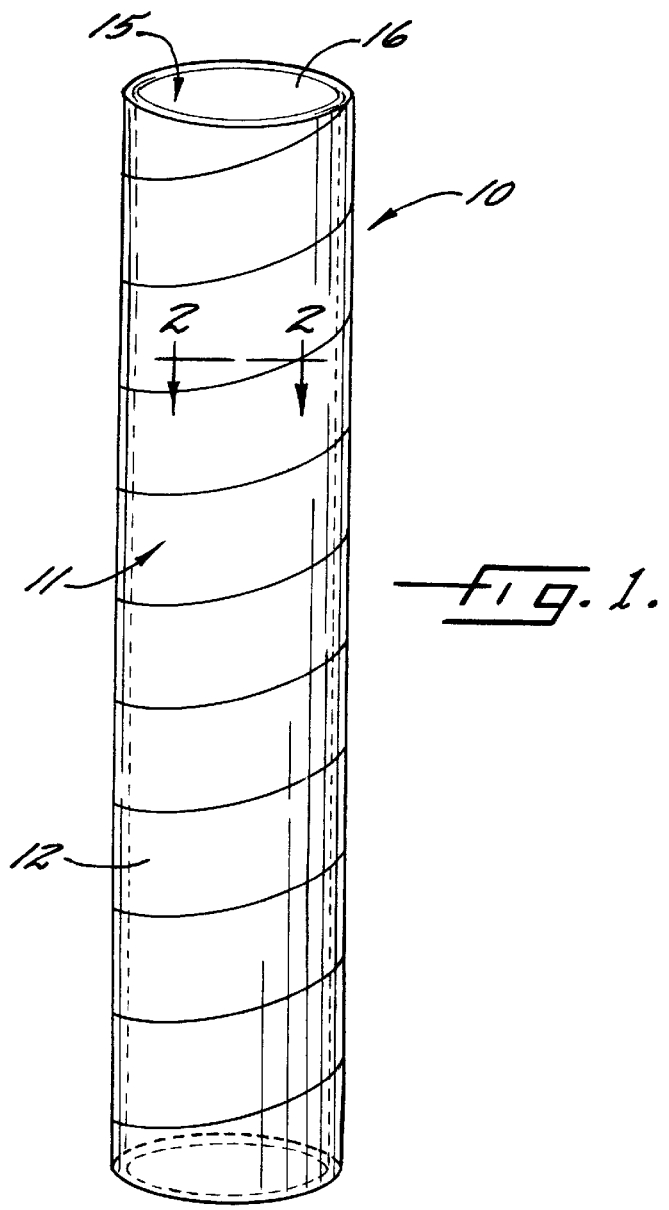
FIG. 1 is a perspective view of a concrete column forming tube constructed in accordance with the present invention.
Figure 2:
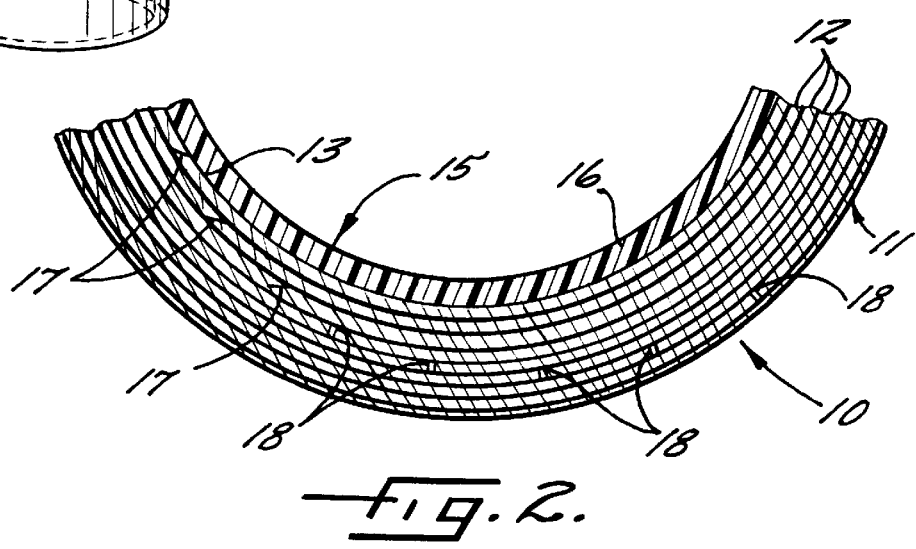
FIG. 2 is a partial cross-sectional view through the concrete forming tube of FIG. 1 and taken generally along the line 2—2 of FIG. 1.
Figure 3:
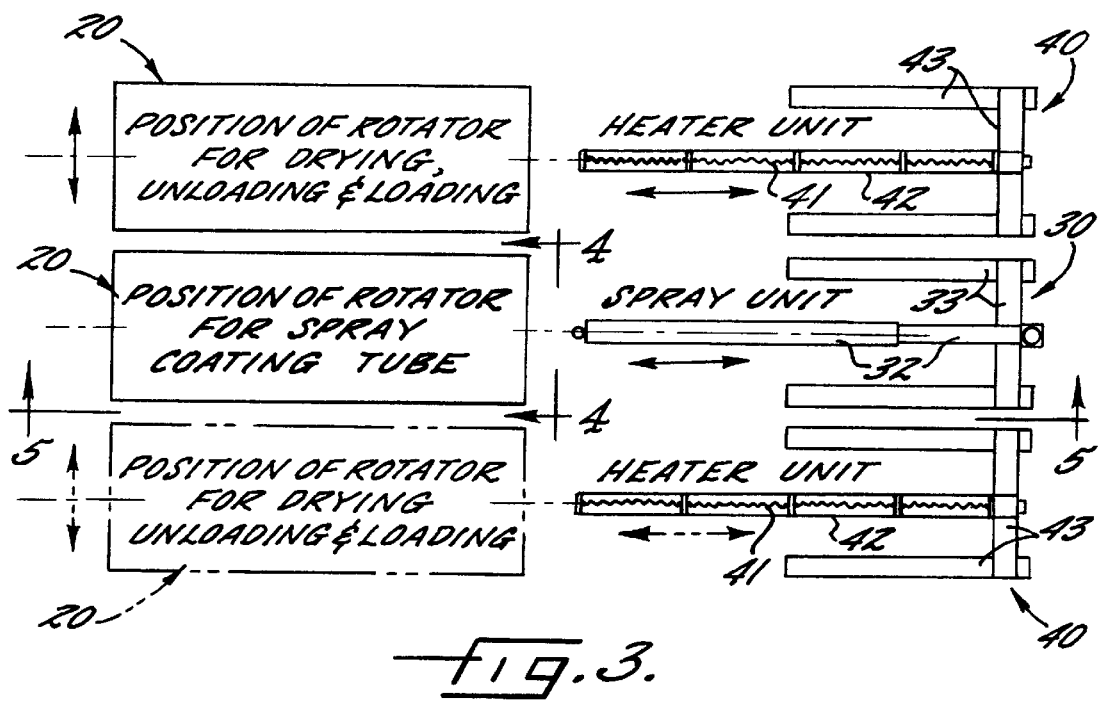
FIG. 3 is a diagrammatic view of apparatus which may be utilized in the preferred method of producing the concrete column forming tube of this invention.
Figure 4:
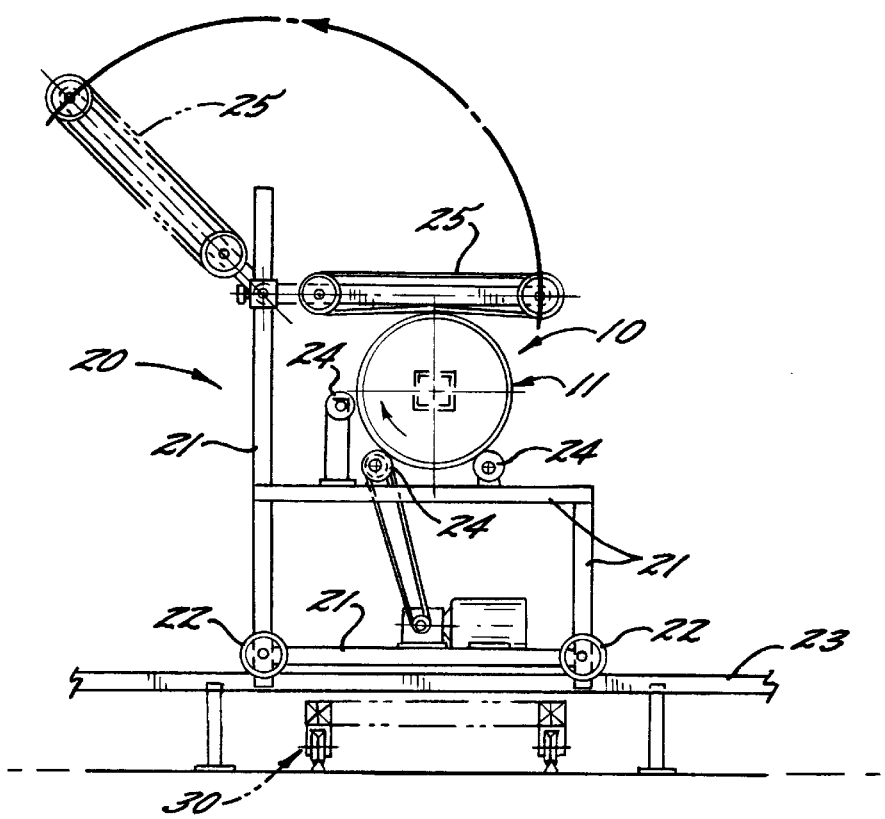
FIG. 4 is an end elevational view of apparatus illustrated diagrammatically in FIG. 3 and taken generally along the line 4—4 of FIG. 3.
Figure 7A:
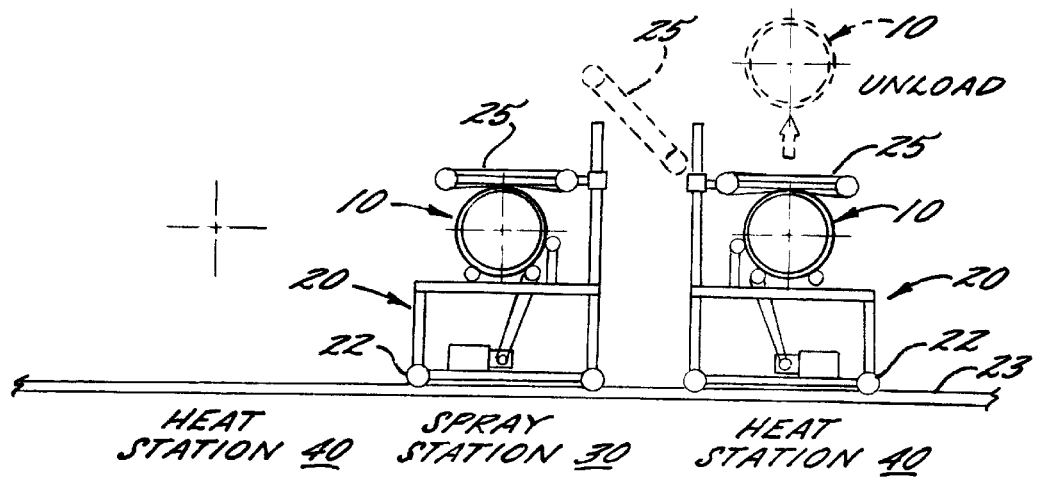
FIG. 7A, B and C are schematic in elevational views of the two rotator devices illustrated in FIG. 3 and showing these devices in three different positions during operation of such devices to perform the preferred method of making concrete column forming tubes in accordance with this invention.
Figure 7B:
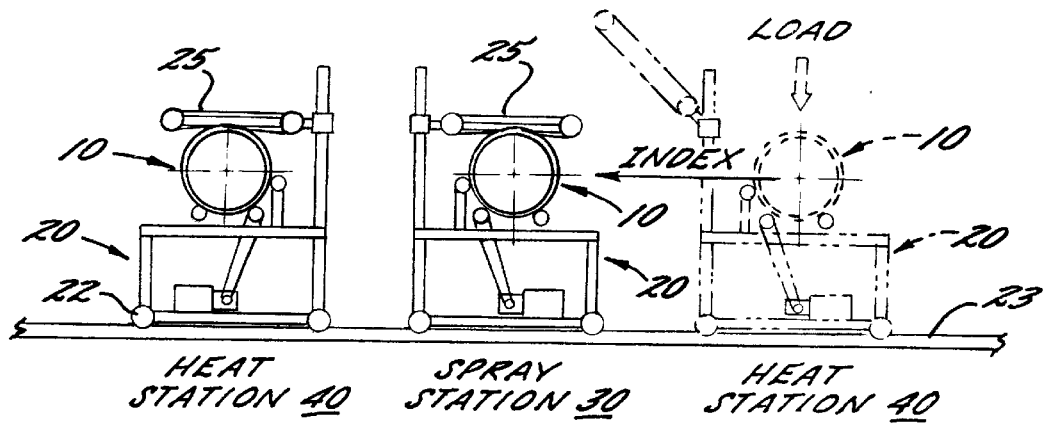
Figure 7C:
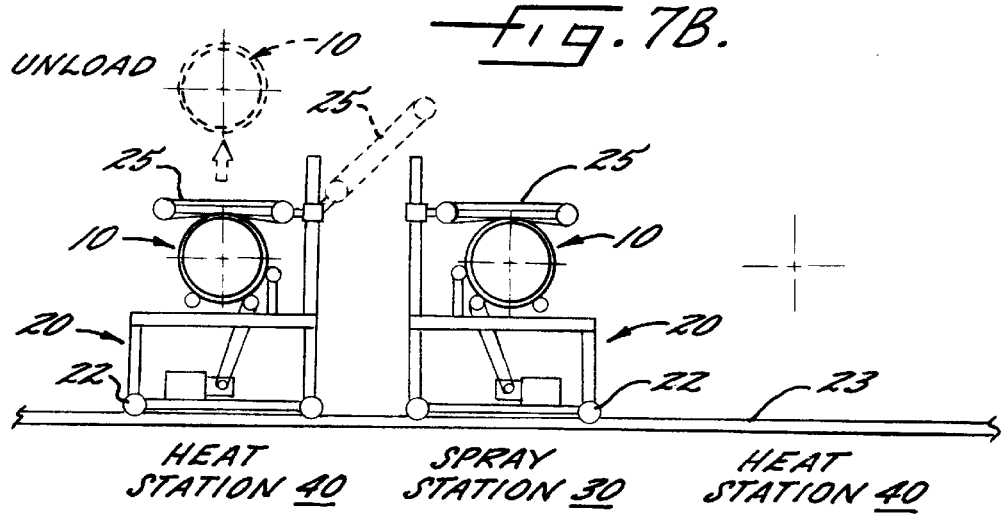

Referring now to the drawings, there is illustrated in FIGS. 1 and 2 a concrete column forming tube 10 for receiving poured concrete therein to produce a concrete column and which is constructed generally in accordance with the present invention.

This concrete column forming tube 10 comprises firstly an elongate rigid cylindrical tube 11 constructed from a plurality of spirally-wound plies 12 of paper adhered together and defining an inside wall surface of predetermined diameter and having spiral seam lines thereon as a result of the spiral winding of the plies 12 into the tube 11. Spiral winding of the plurality of plies 12 to form a tube 11 is well understood by those of ordinary skill in the art and further explanation herein is not deemed necessary.

The concrete column forming tube further includes a centrifugally-cast epoxy resin coating 15 deposited, preferably by spraying, onto the inside wall surface 13 of the spirally-wound paper tube 11 while the tube is rotating to produce a smooth inside coated surface 16 in the forming tube 10, in a manner and by method to be described in more detail below, to eliminate the spiral seam lines and other undesirable characteristics from being molded on an outside surface of a formed concrete column.

Through experimentation, it has been found that the epoxy resin used for the coating 15 should preferably comprise about 75–95% by weight, preferably 83% by weight, low viscosity multifunctional resin and about 25–5% by weight, preferably about 17%, accelerated aliphatic amine catalyst.

Various coating materials were tested for a variety of characteristics including brittleness, smoothness, absence of bubbles in the cured coating, cost, compatibility with paper, stability with moisture, abrasion resistance, low viscosity to successfully form centrifugally-casting, etc. Early testing included polyester and polyurethane as coating materials. The polyurethane offered flexibility, unlike the polyester; however, the polyester did not have bubbles in the cured surface, like the polyurethane, and it was more cost effective. Additional testing of polyester coating revealed brittleness of the coating. This characteristic is not favorable from a shipping and handling standpoint with the finished forming tube 10. Further problems were identified with the polyester coating.

Experimentation was then conducted with epoxy resin materials with various additives as the coatings. It was ultimately determined that a two-part blend of epoxy resins available from Shell Chemical Company and identified as EPI-REZ® 5027, a low viscosity multifunctional resin containing both epoxide groups and reactive unsaturation, and EPI-CURE® 874, an aliphatic amine curing agent, could be centrifugally-cast as a coating 15 on the inside of the spirally-wound paper tube 11 and produce a concrete column forming tube 10 having desired characteristics. It was also found through experimentation that an epoxy resin coating 15 of about 0.010–0.125 inch and preferably about 0.030 inch is preferable for purposes of the present invention.

It has been found that, for a standard 24 inch diameter forming tube 11, the spirally-wound plies 12 of paper should include three inside plies 12 having deckled edges 17, formed by grinding or compressing of the edges, and overlapped with each other as a result of the spiral winding. Each of these three inside plies 12 preferably have a basis weight range of about 90–100 lbs./1000 square feet and a density range of about 3.6–4.0 basis weight/point. These three inside plies 12 preferably have a width of about 7.56 inches and a thickness of about 0.025 inch.

It has also been found that this 24 inch standard spirally-wound paper tube 11 could have outside plies, preferably at least five, which have butted edges 18 when spirally-wound and have a basis weight range of 70–120 lbs./1000 square feet and a density range of about 2.7–3.5 basis weight/point. These outside plies preferably comprise a width of about 7.188 inches and a thickness of about 0.025–0.035 inch. The tube 11 could also include an outside surface ply having a basis weight range of about 70–120 lbs./1000 square feet, a density range of about 2.7–3.5 basis weight/point, a width of about 7.75 inches and a thickness of about 0.015 inch. This thin outside surface ply provides desired outside surface characteristics on the forming tube 10.

With the above construction, the harder and more dense plies 12 forming the inside three plies 12 of the tube 11, along with their deckled overlapped edges, help in minimizing the inside spiral seam lines formed on the inside surface 13 of the tube 11 prior to centrifugally-casting the epoxy resin coating 15 thereon. Selection of the above preferred build-up of the plies 12 of the tube 11 occurred through experimentation with average sized concrete forming tubes in order to cooperate with the selected epoxy resin coating 15 to produce a smooth inside surface 16 on the forming tube 10 as desired by this invention to overcome problems previously existing with these forming tubes.

The above discussed build-up and arrangement of plies is preferred for a 24 inch diameter tube. However, there would be fewer outside plies for a smaller diameter tube and more outside plies for a larger diameter tube. It is believed possible that a suitable inside coated tube could be constructed with only three plies of the deckled and overlapped edge type. It is also believed possible to utilize only one or two of the inside deckled and overlapped edge plies with two or three outside butted edge plies and increase the preferred thickness from 0.030 inch to about 0.045 inch for the epoxy resin coating and get a smooth inside surface. Further experimentation may show that the number of deckled and overlapped edge inside plies may decrease while increasing the thickness of the epoxy resin coating.

Referring now to FIGS. 3–7, the preferred method of making the above described concrete column forming tube 10 is illustrated diagrammatically and schematically. Such method includes the basic steps of providing an elongate rigid cylindrical tube 11, preferably constructed as described above, and capable of receiving concrete therein to form a column, centrifugally-casting an epoxy resin coating 15 on the inside wall surface of the tube by depositing, preferably by spraying, the epoxy resin in the inside of the tube 11 and rotating the tube 11 in a horizontal position, and curing the centrifugally-cast epoxy resin coating 15.

Although various types of apparatuses, devices or mechanisms may be used, in performing the above basic method steps of this invention, applicant has found that a preferred device for receiving and positioning tube 11 in a generally horizontal position and for rotating the device could be in a form of a rotator device 20, as illustrated schematically in FIGS. 3–7, and which includes a frame, collectively designated by the reference numeral 21 mounted on wheels 22 carried on tracks 23 for movement in a transverse direction with respect to the tube 11. The rotator device 20 further includes rollers 24, one of which is driven, to receive the tube 11 in its horizontal position and for rotating the tube 11. A hold-down device 25 is also provided which is adapted to be swung into position over the tube 11 for holding the tube on the rollers 24 and includes a belt mechanism for rotating with the tube 11. This hold-down device 25 is adapted to be swung vertically out of hold down position for loading and unloading a tube 10 on the rotator device 20. Preferably, two rotator devices 20 are provided in parallel, side-by-side position for purposes to be described below.

The step of spraying epoxy resin coating 15 on the inside of the tube 11 may be performed by the use of a spray unit 30. This unit 30 includes a spray head 31 mounted on the end of a telescoping and reciprocating boom device 32 carried on a frame 33 supported by rollers 34 mounted on tracks 35. With this arrangement, the boom device 32 and spray head 31 may be reciprocated into and through the tube 11 while spraying the inside surface 13 of the tube 11 with the epoxy resin while the tube 11 is being rotated by the rotator device 20 and while the boom device 32 is being reciprocated out of the tube 11. Rubber bladders 36 may be positioned on each end of the tube 11 to form a dam for the epoxy resin as it is sprayed by the spray head 31 and before curing thereof to form the epoxy resin coating 15.

It has been found that a preferred epoxy resin coating 15 is centrifugally-cast onto the inside of the tube 11 when the tube is rotated at a surface speed of about 400–850 feet/minute and preferably about 750–850 feet/minute. The epoxy resin is sprayed by the spray head 31 at a rate of about 0.15–0.50 lbs/square foot and preferably about 0.17–0.25 lbs./square foot. The spray head 31 may be any suitable type of spray head for spraying epoxy resin material and it has been found that an air-assisted airless spray gun which is readily available for commercial purchase may be utilized.

For curing the centrifugally-cast epoxy resin coating 15 on the inside surface 13 of the tube 11, the rotator device 20 is moved in a direction transverse to the tube and away from the spray unit 30 to a heater unit 40. The heater unit 40 also includes a reciprocating boom device 42 having a suitable type of heater unit 41 thereon and being carried on a frame 43 mounted on a roller and track mechanism like the spray unit 30 for reciprocating the heater unit 41 into the inside of the tube 11 after the epoxy resin coating 15 has been applied thereto for curing the epoxy resin coating 15. It has been found that the epoxy resin coating 15 can be satisfactorily cured if heated to a temperature of about 150°–200° F. for a period of about 20–25 minutes.

A preferred method in accordance with this invention utilizes two rotator devices 20, as discussed above, in side-by-side parallel position and two heater units 40 respectively positioned on each side of the spray unit 30 so that tubes 11 may be positioned in side-by-side horizontal positions on the rotator devices 20 either of which can be moved back and forth in a direction transverse to the tubes 11 so that while one rotator device 20 with a tube 11 thereon is in position at the spray unit 30, the other rotator device 20 is in position in front of the respective first and second heater units 40. In this manner, the step of spraying the epoxy resin coating 15 on the inside surface 13 of the tube 11 can be performed on one tube 11 on one of the two rotator devices 20 while the other tube 11 with a centrifugally-cast coating 15 thereon can be simultaneously cured by heater unit 40 while positioned on the other rotator device 20. Also, both rotator devices 20 can be stationed at the same time at first and second heater units 40 for simultaneous curing of coating 15 on tubes 11. After curing, the finished forming tube 10 is unloaded from the respective rotator device 20 and an uncoated tube 11 is loaded onto the rotator device 20 for subsequent transverse movement into position in front of the spray unit 30. This sequence of operation conserves time since the centrifugally-casting step of the method is much faster than the curing step of the method. This sequence of steps of a method of this invention has been illustrated diagrammatically in FIG. 7A, B and C.

While full details of the apparatus use for performing the method of this invention have not been fully illustrated or described herein, it is believed that sufficient details have been illustrated and described so as to fully understand the method of this invention and the preferred steps thereof.

In the drawings and specification that there has been set forth a preferred embodiment of the concrete column forming tube and method of making same in accordance with this invention, and although specific terms are employed, they are used in a generic and descriptive sense only and not for purposes of limitation, the scope of the invention is defined in the following claims.

What is claimed is:

1. A concrete column forming tube for receiving poured concrete therein to produce a concrete column; said forming tube comprising:

an elongate rigid cylindrical tube capable of receiving concrete therein to form a column and comprising spirally-wound plies of paper adhered together and defining an inside wall surface having spiral seam lines thereon; and a centrifugally-cast epoxy resin coating sprayed onto said inside wall surface of said spirally-wound paper tube while said tube is rotating, said coating when sprayed having a sufficiently low viscosity to produce an inside coated surface on said forming tube extending continuously across said spiral seam lines and having a thickness and smoothness sufficient to eliminate spiral seam lines and other undesirable characteristics on an outside surface of said formed concrete column.

2. A concrete column forming tube, as set forth in claim 1, in which said epoxy resin coating comprises about 75–95% by weight low viscosity multifunctional resin and about 25–5% by weight accelerated aliphatic amine catalyst.

3. A concrete column forming tube, as set forth in claim 1, in which said epoxy resin coating comprises about 83% by weight low viscosity multifunctional resin and about 17% by weight accelerated aliphatic amine catalyst.

4. A concrete column forming tube, as set forth in claim 1, 2 or 3, in which said centrifugally-cast epoxy resin coating has a thickness of about 0.010–0.125 inch.

5. A concrete column forming tube, as set forth in claim 1, 2 or 3, in which said centrifugally-cast epoxy resin coating has a thickness of about 0.030–0.045 inch.

6. A concrete column forming tube, as set forth in claim 1, in which said spirally-wound plies of paper of said cylindrical tube include three inside plies having deckled overlapped edges.

7. A concrete column forming tube, as set forth in claim 6, in which each of said three inside plies comprise a paper ply having a basis weight range of about 90–100 lbs./1000 square feet and a density range of about 3.6–4.0 basis weight/point.

8. A concrete column forming tube, as set forth in claim 7, in which each of said three inside plies comprise a width of about 7.563 inches and a thickness of about 0.025 inch.

9. A concrete column forming tube, as set forth in claim 6, 7 or 8, in which said spirally-wound plies of paper of said cylindrical tube include outside plies having butted edges.

10. A concrete column forming tube, as set forth in claim 9, in which said outside plies include paper plies having a basis weight range of about 70–120 lbs./1000 square feet and a density range of about 2.7–3.5 basis weight/point.

11. A concrete column forming tube, as set forth in claim 10, in which said outside plies include plies comprising a width of about 7.188 inches and a thickness of about 0.025–0.035 inch.

12. A concrete column forming tube, as set forth in claim 11, in which said spirally-wound plies of paper of said cylindrical tube include an outside surface ply having a basis weight range of about 70–120 lbs./1000 square feet, a density range of about 2.7–3.5 basis weight/point, a width of about 7.750 inches and a thickness of about 0.015 inch.

13. A concrete column forming tube, as set forth in claim 11, in which said outside plies further include paper plies having a basis weight of about 100–110 lbs./1000 square feet, a density of about 2.9–3.2 basis weight/point, a width of about 7.188 inches and a thickness of about 0.035 inch.

14. A concrete column forming tube for receiving poured concrete therein to produce a concrete column; said forming tube comprising:

an elongate rigid cylindrical tube capable of receiving concrete therein to form a column and comprising spirally-wound plies of paper adhered together and defining an inside wall surface having spiral seam lines thereon, said spirally-wound plies comprising three inside plies having deckled overlapped edges and each having a basis weight range of about 90–100 lbs./1000 square feet and a density range of about 3.6–4.0 basis weight/point, and at least five outside plies having butted edges and having a basis weight range of about 70–120 lbs./1000 square feet and a density range of 2.7–3.5 basis weight/point; and a centrifugally-cast epoxy resin coating sprayed onto said inside wall surface of said spirally-wound paper tube while said tube is rotating, said coating when sprayed having a sufficiently low viscosity to produce an inside coated surface on said forming tube extending continuously across said spiral seam lines and having a thickness and smoothness sufficient to eliminate spiral seam lines and other undesirable characteristics on an outside surface of said formed concrete column, said epoxy resin comprising about 75–95% by weight low viscosity multifunctional resin and about 25–5% by weight accelerated aliphatic amine catalyst, and said centrifugally-cast epoxy resin coating having a thickness of about 0.010–0.125 inch.

15. A concrete column forming tube, as set forth in claim 14, in which said inside plies of said cylindrical tube comprise a width of about 7.563 inches and a thickness of about 0.025 inch, and in which at least five outside plies comprise a width of about 7.188 inches and a thickness of about 0.025–0.035 inch.

* * * * *